(12) United States Patent
Wang

(10) Patent No.: US 9,454,248 B2
(45) Date of Patent: Sep. 27, 2016

(54) TOUCH INPUT METHOD AND ELECTRONIC APPARATUS THEREOF

(71) Applicant: GETAC TECHNOLOGY CORPORATION, Hsinchu County (TW)

(72) Inventor: Chen-Ping Wang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 54 days.

(21) Appl. No.: 14/556,044

(22) Filed: Nov. 28, 2014

(65) Prior Publication Data

US 2016/0154480 A1    Jun. 2, 2016

(51) Int. Cl.
| | |
|---|---|
| *G06F 3/033* | (2013.01) |
| *G09G 5/08* | (2006.01) |
| *G06F 3/038* | (2013.01) |
| *G06F 3/0486* | (2013.01) |
| *G06F 3/0484* | (2013.01) |

(52) U.S. Cl.
CPC ........... *G06F 3/0383* (2013.01); *G06F 3/0486* (2013.01); *G06F 3/04842* (2013.01); *G06F 2203/04104* (2013.01); *G06F 2203/04806* (2013.01); *G06F 2203/04808* (2013.01)

(58) Field of Classification Search
CPC . G06F 3/038; G06F 3/03313; G06F 3/03333
USPC .................................. 345/156–158, 173–179
See application file for complete search history.

(56) References Cited

U.S. PATENT DOCUMENTS

| | | | | |
|---|---|---|---|---|
| 2013/0181918 A1* | 7/2013 | Ting | ..................... | G06F 3/04817 345/173 |
| 2014/0225861 A1* | 8/2014 | Yamaguchi | .............. | G06F 3/045 345/174 |
| 2015/0002424 A1* | 1/2015 | Yamamoto | .......... | G06F 3/04883 345/173 |
| 2015/0234507 A1* | 8/2015 | Chun | ..................... | G06F 1/1616 345/173 |
| 2015/0268747 A1* | 9/2015 | Kim | ....................... | G06F 3/0488 345/173 |

\* cited by examiner

*Primary Examiner* — Kimnhung Nguyen

(57) ABSTRACT

A touch input method and an electronic apparatus thereof are provided. The touch input method is adapted to a touch module for controlling a pointer on a virtual display screen. The touch input method includes the following steps. Detecting the touch module, and a first input position and a second input position are detected during a detecting period, wherein the first input position is corresponding to a first input signal, and the second input position is corresponding to a second input signal. A command is formed by the first input signal and the second input signal jointly, and the pointer executes a specific function following the command.

12 Claims, 11 Drawing Sheets

TOUCH INPUT METHOD AND ELECTRONIC APPARATUS THEREOF

BACKGROUND OF THE INVENTION

1. Field of the Invention

The present invention relates to an input method, particularly to a touch input method and an electronic apparatus thereof.

2. Description of the Prior Art

With the development of technology, many different electronic apparatuses, such as PC, notebook or mobile device, successively come out and are widely used in daily life. When a user issues a command to the PC, notebook computer and other mobile device, this is usually processed through an input interface, for example, a keyboard, a mouse, or a touch pad. More specifically, the user can move the pointer displayed on the screen through the mouse, and select and click on a window, a shortcut, and a function icon the pointer passes through. Nevertheless, the mouse is mostly designed to be externally connected, requiring additional carry-on and installation as well as certain operation space needed for use. Thus, in the common notebook computer or mobile device, the mouse is usually replaced by a touch pad, such that the user can control the pointer on a display screen with the touch pad.

Although the touch pad can be used to control the pointer on the display screen, the pointer may not flexibly execute operations such as select, click, execute, and drag. Thus, the common touch pad cannot completely replace the mouse, but is usually only used to replace partial functions of the mouse, and must be used with physical left/right keys together to provide a better operation feeling. In other words, how to use the touch module with touch capabilities to provide a better touch input method is still one of the objectives for those skilled in the art.

SUMMARY OF THE INVENTION

The present invention provides a touch input method and an electronic apparatus thereof, and provides more intuitive operation for users without physical keys on the mouse or touch pad.

The present invention provides a touch input method adapted to a touch module for controlling a pointer on a virtual display screen. The touch input method includes the following steps. Detecting a touch module, and a first input position and a second input position are detected during a detecting period, wherein the first input position is corresponding to a first input signal, and the second input position is corresponding to a second input signal. A command is formed by the first input signal and the second input signal jointly, and the pointer executes a specific function following the command.

The present invention provides an electronic apparatus which includes a touch module, a detecting unit, and a control unit. The touch module is used to control a pointer on a virtual display screen. The detecting unit is coupled to the touch module to detect the touch module. A first input position and a second input position are detected by detecting unit during a detecting period, wherein the first input position is corresponding to a first input signal, and the second input position is corresponding to a second input signal. The control unit is coupled to the detecting unit, and controls the pointer to execute a specific function following a command formed by the first input signal and the second input signal jointly.

Based on the above, the touch input method and the electronic apparatus thereof provided according to the present invention detects the first input position corresponding to the first input signal and the second input position corresponding to the second input signal and correspondingly controls the pointer according to the command formed by the first input signal and the second input signal jointly. In other words, the pointer can correspondingly execute different functions according to the detected time of the first input signal and the second input signal, the relative position between the first input position and the second input position, and the subsequent changes of the first input position and the second input position. In this way, users can perform more flexible and more comprehensive operations. Also, the operational efficiency and feelings of using the pointer can be enhanced.

Hereinafter, the characteristic and merits of the present invention described above will become more obvious with reference to embodiments in conjunction with the accompanying draws.

DETAILED DESCRIPTION OF THE EMBODIMENTS

Figure 1:
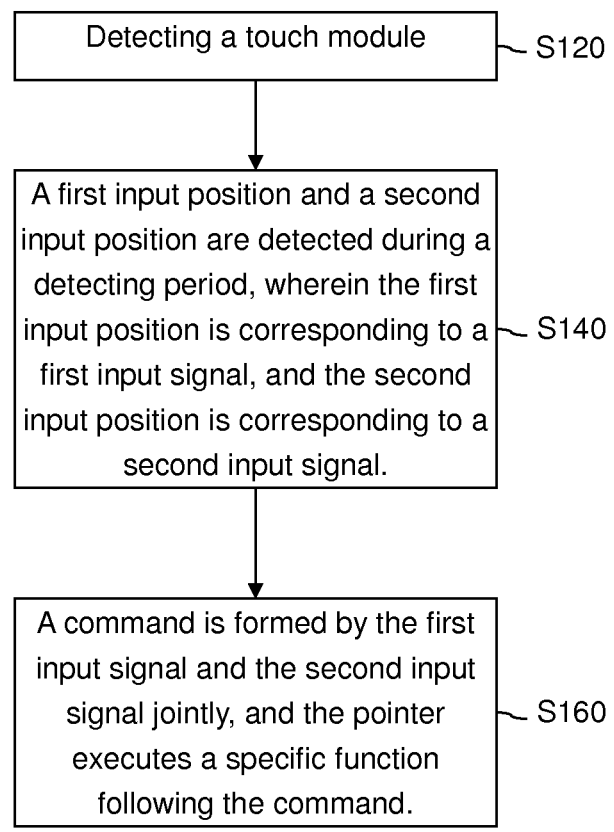
FIG. 1 is a flowchart showing a primary touch input method according to an embodiment of the present invention.

Referring now to exemplary embodiments of the present invention. The exemplary embodiments will be described in detail with the accompanying drawings. Also, wherever possible, the same numerical components/elements used in the drawings and embodiments represent the same or similar parts.

FIG. 1 is a flowchart showing a primary touch input method according to an embodiment of the present invention. The touch input method proposed in the present invention is adapted to an electronic apparatus with a touch module for controlling a pointer on a virtual display screen. The aforementioned electronic apparatus may be, for example, a Personal Computer (PC), a laptop, a tablet, or a Smart Phone, but it is not limited thereto. The touch module, for example, may be a touch pad common in the electronic apparatus, which supports multi-touch function, and may be a resistive touch pad, a capacitive touch pad or an electromagnetic touch pad, but not limited thereto. In general, the aforementioned electronic apparatus further includes a display device or a display to display various objects and pointers on the virtual display screen.

Referring to FIG. 1, the steps of a primary touch input method are as follows. First, detecting a touch module (Step S120). A first input position and a second input position are detected during a detecting period, wherein the first input position is corresponding to a first input signal, and the second input position is corresponding to a second input signal (Step S140). A command is formed by the first input signal and the second input signal jointly, and the pointer executes a specific function following the command (Step S160). In detail, the touch module is used as an input interface of the electronic apparatus. The user can use objects such as a finger or stylus to execute various actions such as press, click, or drag on the touch module to generate input signals, thereby replacing a conventional physical left key on the touch pad (or simulating mouse's left button function) to control the pointer on the virtual display screen. Through identifying and analyzing multiple input positions corresponding to multiple input signals, the electronic apparatus determines the user's intent and enables the pointer to correspondingly execute different functions.

Figure 2:
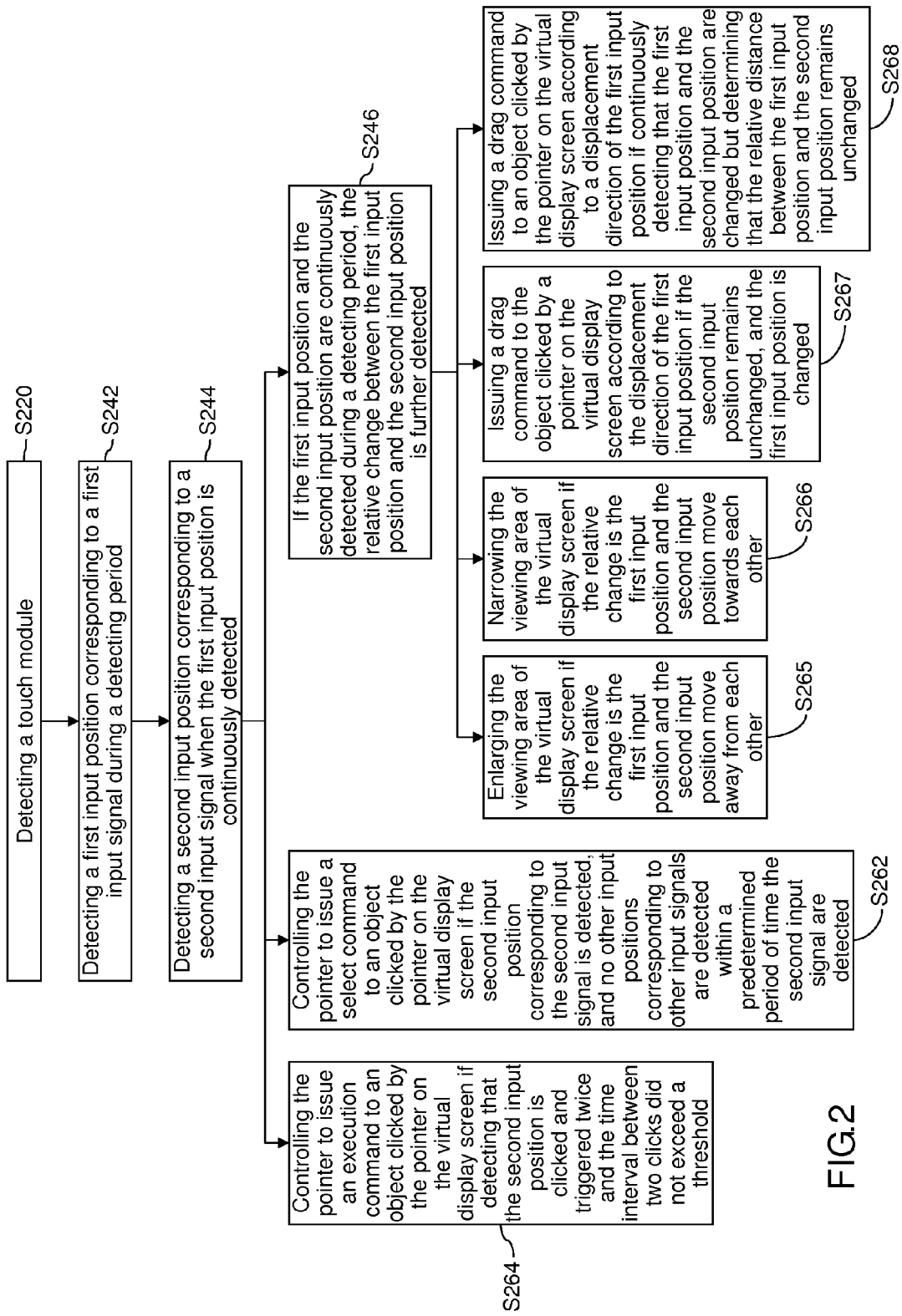
FIG. 2 is a flowchart showing details of the touch input method according to an embodiment of the present invention.
Figure 3:
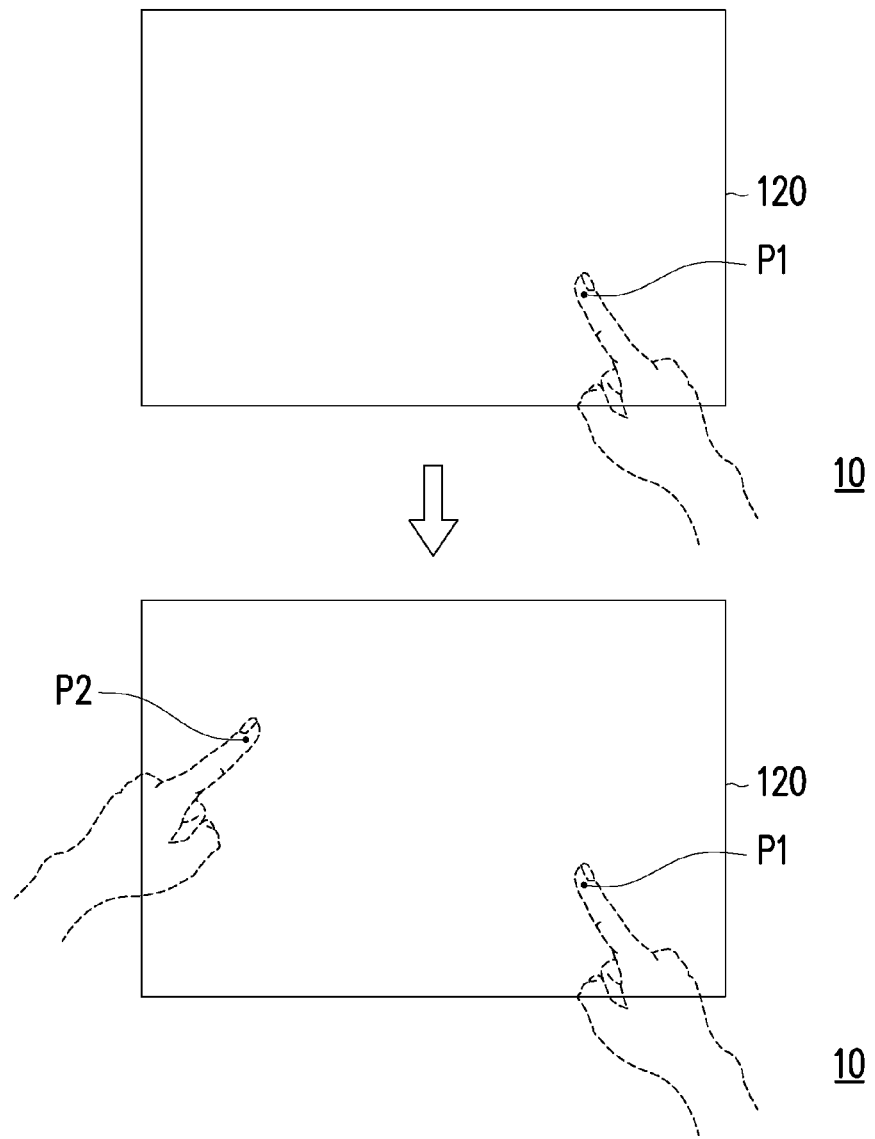
FIG. 3 is a view showing a first input position and a second input position being detected according to an embodiment of the present invention.

Hereinafter, the aforementioned touch input method in more than one embodiment will be described in detail. FIG. 2 is a flowchart showing details of the touch input method according to an embodiment of the present invention. Referring to FIG. 2, in the present embodiment, the touch input method first detects a touch module (Step S220) to detect the user's intended input behavior. FIG. 3 is a view showing a first input position and a second input position being detected according to an embodiment of the present invention. Referring now to FIG. 2 and FIG. 3, a first input position P1 corresponding to a first input signal is detected on the touch module 120 of the electronic apparatus 10 during a detecting period (Step S242). Then, when the first input position P1 is continuously detected, a second input position P2 corresponding to a second input signal is detected (Step S244). Specifically, when the first input position P1 corresponding to the first input signal is continuously detected, if only the electronic apparatus 10 further detects the second input position P2 corresponding to the second input signal, it will determine, according to the input time of the first input signal and the second input signal and the relative position and displacement between the first input position P1 and the second input position P2 on the touch module 120, a command formed by the first input signal and the second input signal jointly to further control the pointer to execute a different function correspondingly.

Figure 4:
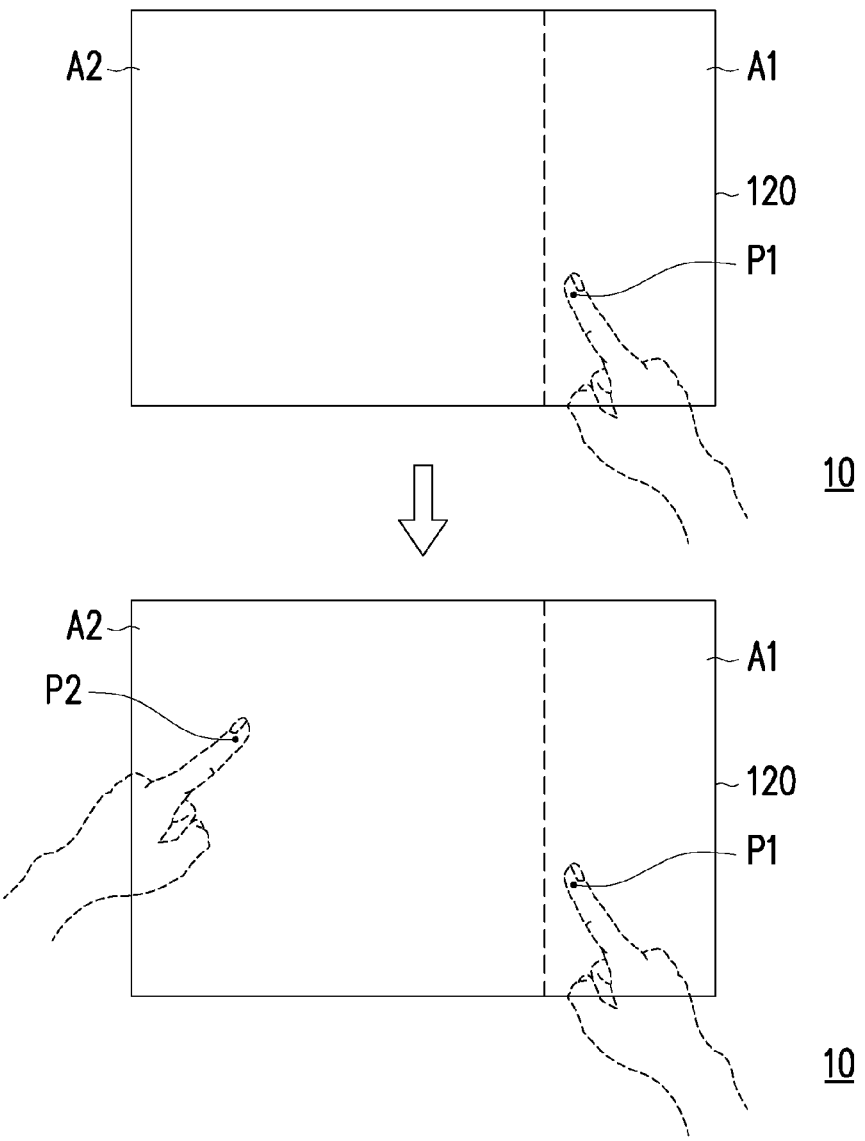
FIG. 4 is a view showing the first input position and the second input position being detected according to another embodiment of the present invention.

FIG. 4 is a view showing a first input position and a second input position being detected according to another embodiment of the present invention. Referring to FIG. 2 and FIG. 4, in another embodiment of the present invention, to more accurately detect and identify the first input position P1 corresponding to the first input signal and the second input position P2 corresponding to the second input signal, upon detecting the first input position P1 corresponding to the first input signal (Step S242), the touch module 120 will predefine a first block A1 and a second block A2. The first block A1 includes the first input position P1. The second input position P2 subsequently detected (corresponding to the second input signal, Step S244) will be included in the second block A2. The electronic apparatus 10 further controls the pointer with a command formed by the first input signal and the second input signal jointly. Conversely, after the first input position P1 corresponding to the first input signal is detected, if another input position corresponding to other input signal is detected in the first block A1, none of the aforementioned command is formed.

For example, as shown in FIG. 4, the first block A1 and the second block A2 can be a right block and a left block of the touch module 120 divided using the first input position P1 as a reference limit. After the first input position P1 corresponding to the first input signal is detected, if the left block (second block A2) of the touch module 120 detects the second input position P2 corresponding to the second input signal, it further controls the pointer according to a command formed by the first input signal and the second input signal jointly. It is noteworthy that the method for defining the first block A1 and the second block A2 is not limited to the aforementioned.

As described above, if the first input position P1 corresponding to the first input signal and the second input position P2 corresponding to the second input signal during the detecting period are certainly detected, the time interval between input signals, the relative position between input positions and changes of the input positions are further analyzed to clarify the intent of the users operation. Then, the pointer is controlled according to a command formed by the first input signal and the second input signal to execute a specific function.

Figure 5:
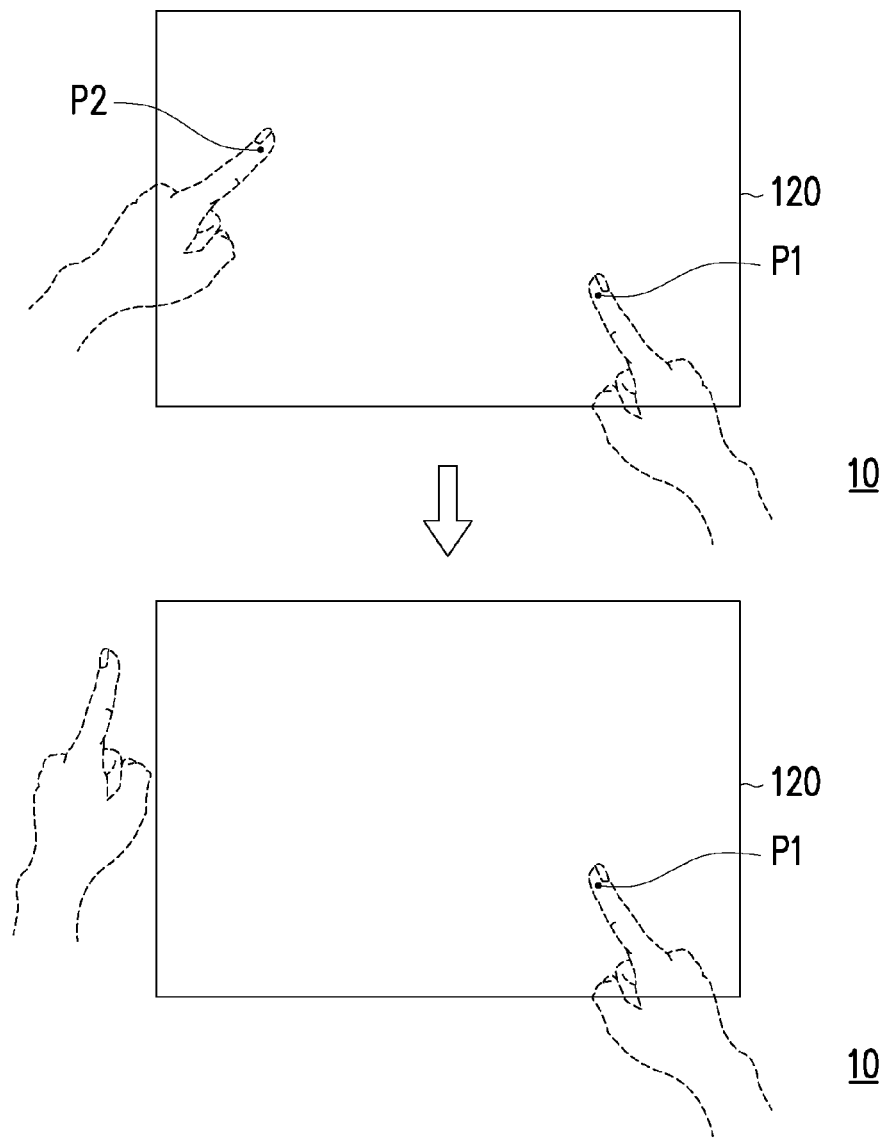
FIG. 5 is a view showing a command formed by the first input signal and the second input signal jointly according to an embodiment of the present invention.

FIG. 5 is a view showing a command formed by the first input signal and the second input signal jointly according to an embodiment of the present invention. Referring now to FIG. 2 and FIG. 5, when the first input position P1 during a detecting period is continuously detected, if the second input position P2 corresponding to the second input signal is detected on the touch module 120, and no other input positions corresponding to other input signals are detected within a preset period of time the second input signal is detected, the electronic apparatus 10 controls the pointer to perform a select command to an object clicked by the pointer on the virtual display screen (Step S262). In the present embodiment, the interval of the second input signal falls within a predetermined period of input time.

From a users point of view, the embodiment in FIG. 5 indicates that the user clicks on the second input position P2 of the touch module 120 while continuously pressing on the first input position P1 of the touch module 120. According to the first input position P1 corresponding to the first input signal and the second input position P2 corresponding to the second input signal, the electronic apparatus 10 determines that the user wants to perform a select operation, and then issues a select command to the object the pointer clicked.

Figure 6:
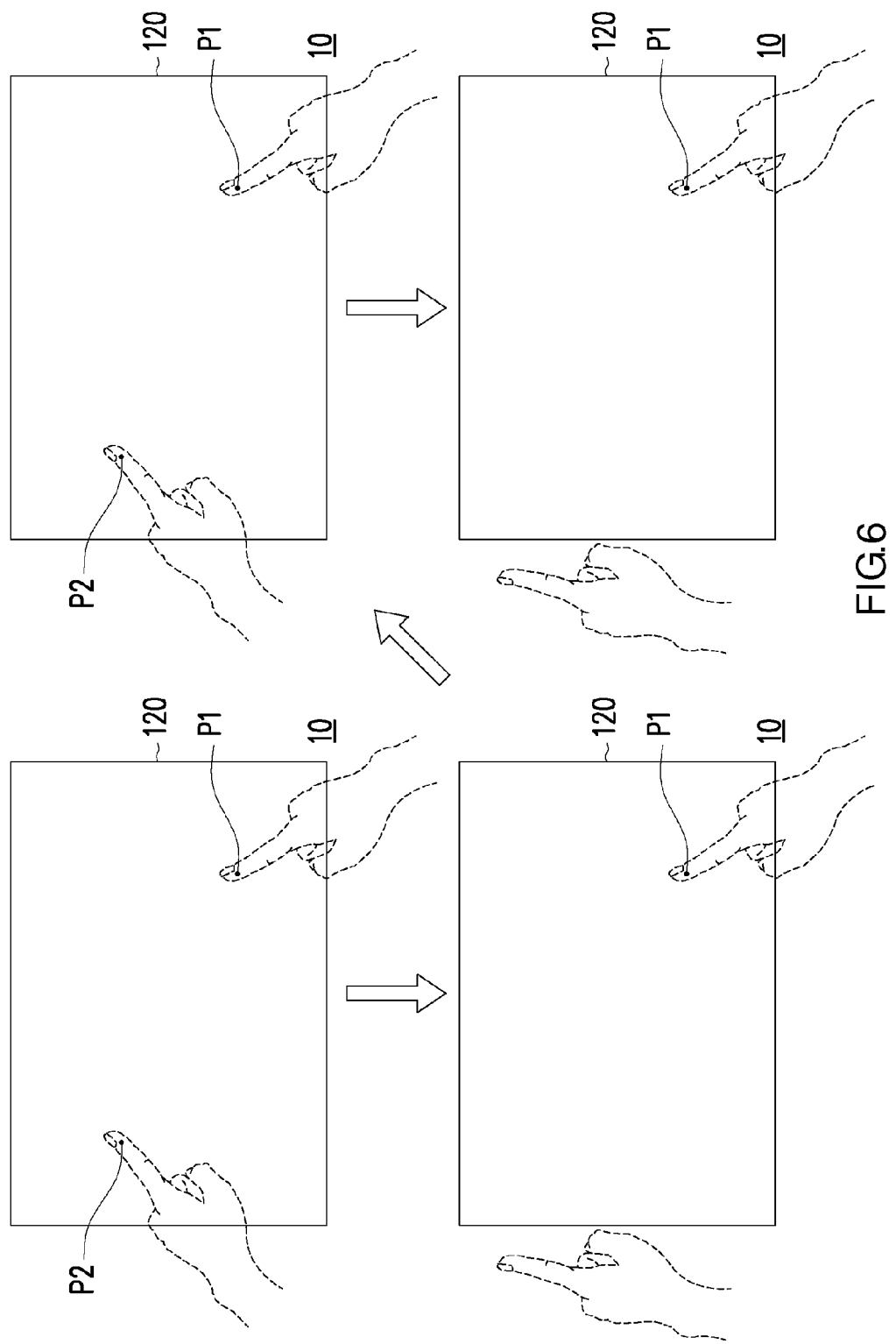
FIG. 6 is a view showing the command formed by the first input signal and the second input signal jointly according to another embodiment of the present invention.

FIG. 6 is a view showing the command formed by the first input signal and the second input signal jointly according to another embodiment of the present invention. Referring now to FIG. 2 and FIG. 6, during the detecting period, when the first input position P1 is continuously detected, if detecting that the second input position P2 is clicked and triggered twice on the touch module 120 and the time interval between two clicks did not exceed a threshold, the electronic apparatus 10 controls the pointer to issue an execution command to the object clicked on the virtual display screen (Step S264). In other words, when the first input position P1 corresponding to the first input signal is continuously detected, the electronic apparatus 10 also detects the second input position P2 corresponding to the second input signal twice. In the present embodiment, the interval of every second input signal falls within a predetermined period of input time, and two intervals of the second input signal are less or equal to a threshold. In addition, as to the embodiment as shown in FIG. 6, the first input position P1 remains unchanged during the two intervals of the second input position P2 being detected.

From a users point of view, the embodiment in FIG. 6 indicates that the user clicks the second input position P2 of the touch module 120 twice while continuously pressing on the first input position P1 of the touch module 120, and the time interval of the two clicks does not exceed the aforementioned one. According to the first input position P1 corresponding to the first input signal and the second input position P2 corresponding to the second input signal, the electronic apparatus 10 determines that the user wants to perform an execute operation and then issues an execution command to the object clicked by the pointer to execute an application or a specific function.

Figure 7:
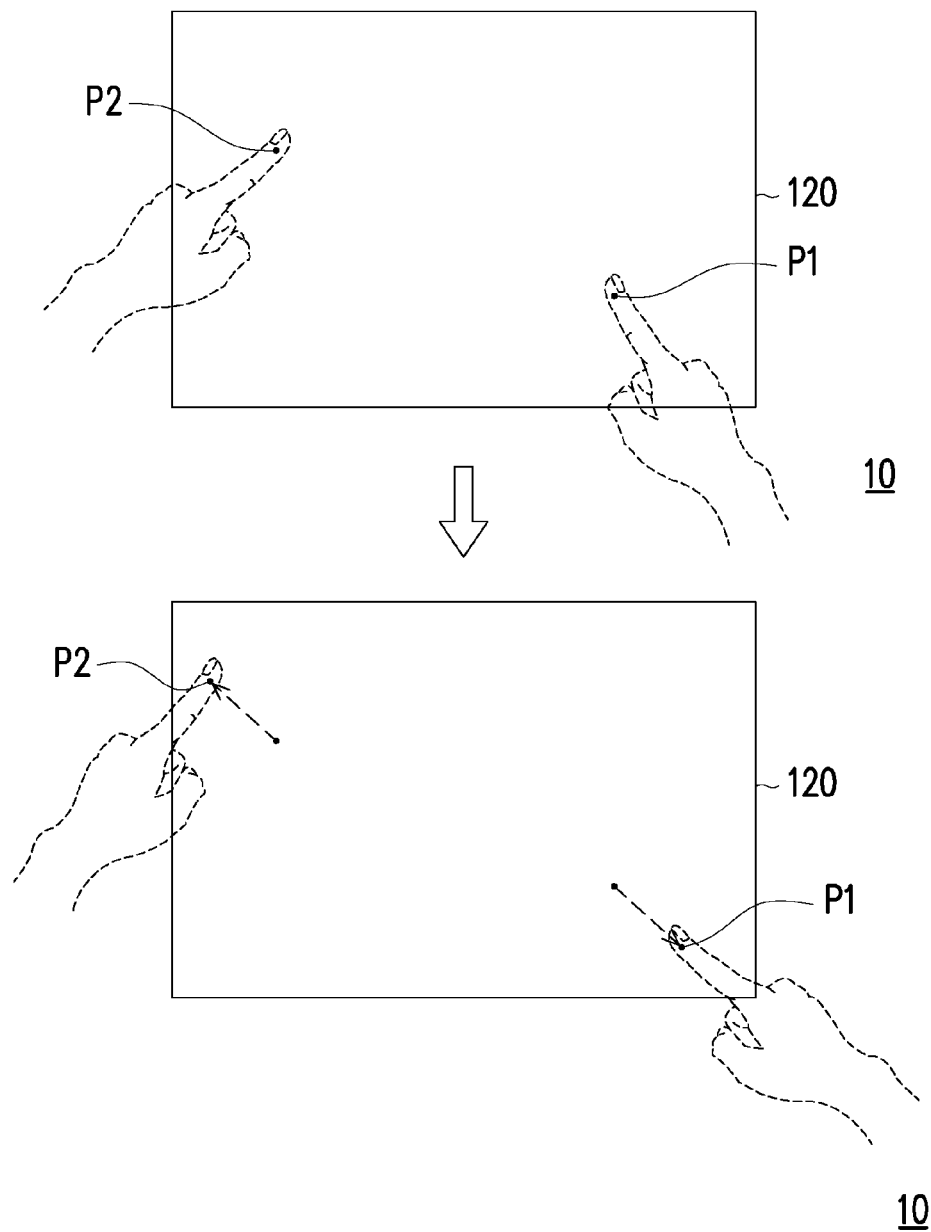
FIG. 7 is a view showing the command formed by the first input signal and the second input signal jointly according to a further embodiment of the present invention.
Figure 8:
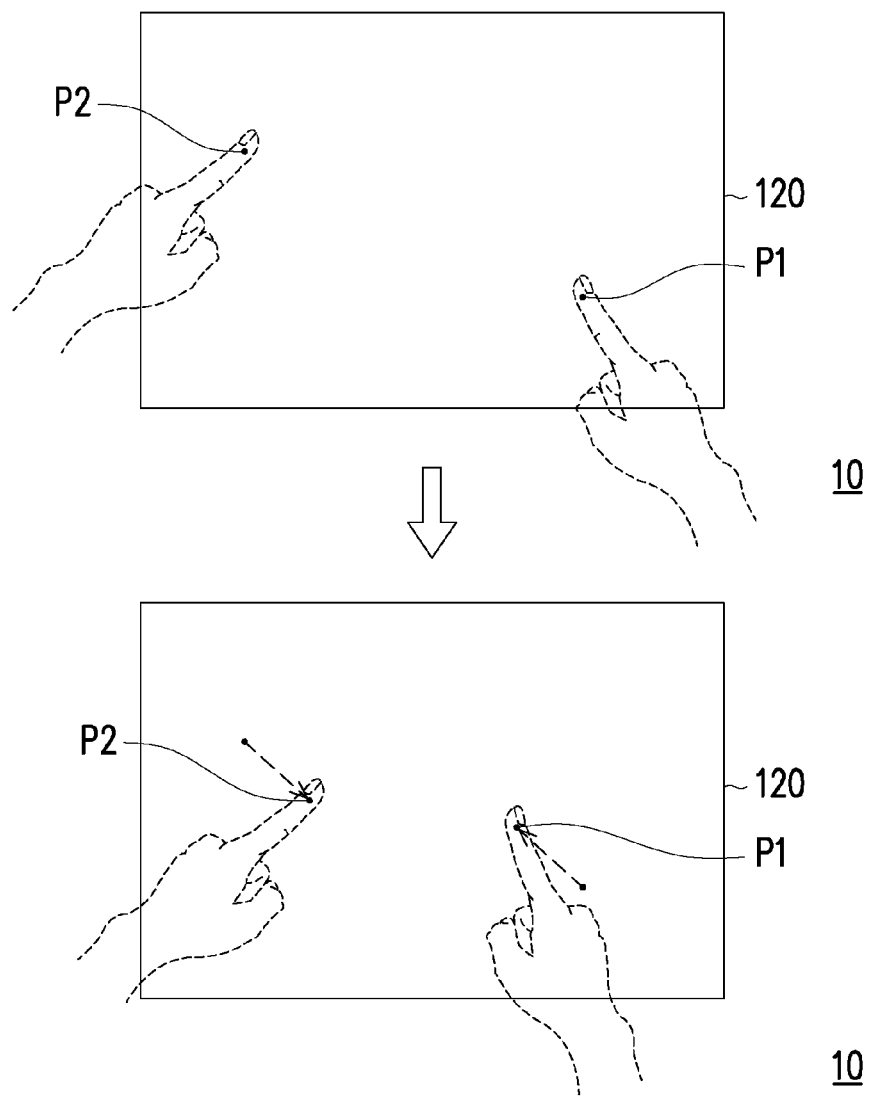
FIG. 8 is a view showing the command formed by the first input signal and the second input signal jointly according to a further embodiment of the present invention.

FIG. 7 is a view showing the command formed by the first input signal and the second input signal jointly according to a further embodiment of the present invention. FIG. 8 is a view showing the command formed by the first input signal and the second input signal jointly according to yet another embodiment of the present invention. Referring now to FIGS. 2, 7, and 8, during the detecting period, if the first input position P1 and the second input position P2 are continuously detected, the relative change between the first input position P1 and the second input position P2 is further detected (Step S246). As shown in FIG. 7, if the relative change is the first input position P1 and the second input position P2 move away from each other, the electronic apparatus 10 enlarges the viewing area of the virtual display screen (Step S265).

From a users point of view, the embodiment in FIG. 7 indicates that the user continuously presses on the touch module 120, and moves the first input position P1 and the second input position P2 on the touch module 120, such that the two positions move away from each other gradually. When determining that the relative change between the first input position P1 and the second input position P2 is gradually moving away from each other, the electronic apparatus 10 determines that the user want to zoom in, and thus correspondingly enlarges a viewing area of the virtual display screen.

Conversely, as shown in FIG. 8, if the relative change is that the first input position P1 and the second input position P2 move towards each other, the electronic apparatus 10 narrows a viewing area of the virtual display screen (Step S266).

From a users point of view, the embodiment in FIG. 8 indicates that the user continuously presses on the touch module 120, and moves the first input position P1 and the second input position P2 on the touch module 120, such that the two positions move towards each other gradually. When determining that the relative change between the first input position P1 and the second input position P2 is moving towards each other gradually, the electronic apparatus 10 determines that the user wants to zoom out, and thus correspondingly narrow the viewing area of the virtual display screen. It is noteworthy that, when the relative change between the first input position P1 and the second input position P is further detected in the embodiment described above, the first input position P1 and the second input position P2 may not necessarily be moved on the touch module 120.

Figure 9:
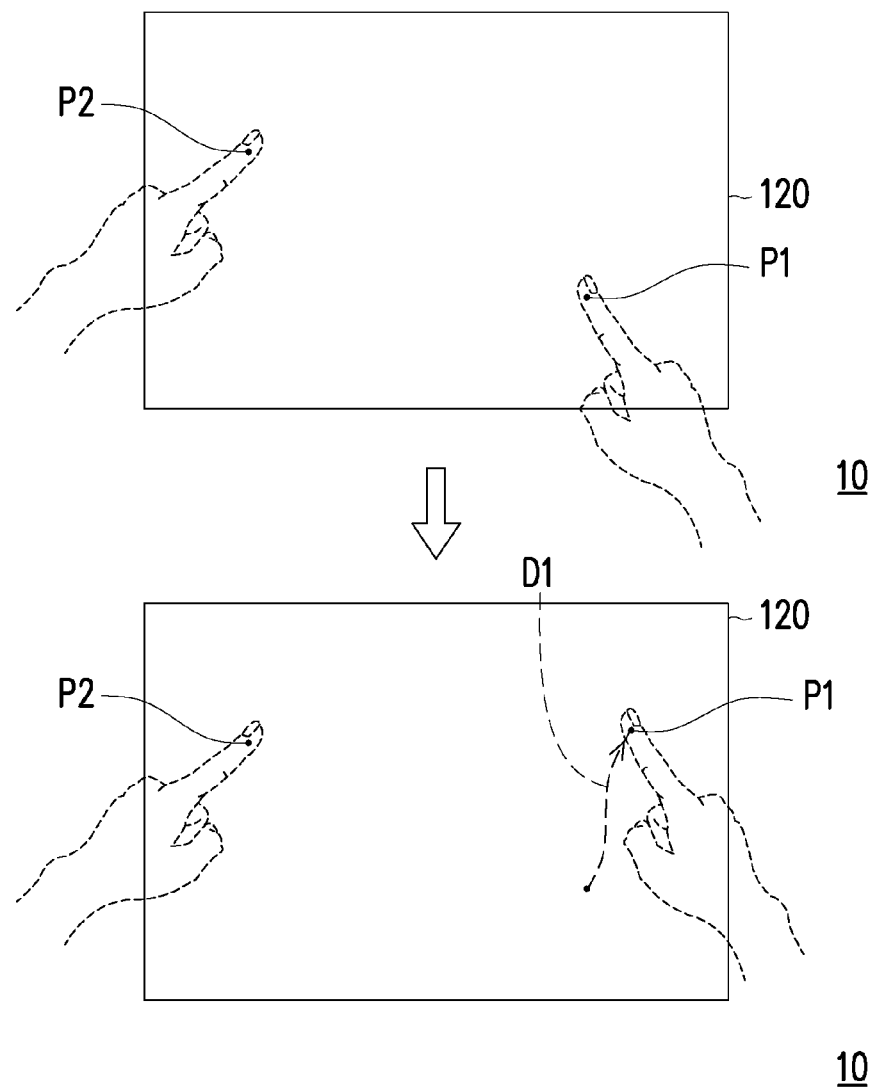
FIG. 9 is a view showing the command formed by the first input signal and the second input signal jointly according to yet another embodiment of the present invention.

FIG. 9 is a view showing the command formed by the first input signal and the second input signal jointly according to yet another embodiment of the present invention. Referring to FIG. 2 and FIG. 9, if the second input position P2 remains unchanged, and the first input position P1 is changed, the electronic apparatus 10 issues a drag command to the object clicked by a pointer on the virtual display screen according to the displacement direction D1 of the first input position (Step S267).

From a users point of view, the embodiment in FIG. 9 indicates that the user continuously presses on the second input position P2 and keeps the second input position P2 unchanged while continuously pressing and moving the first input position P1 on the touch module 120. The displacement direction D1 of moving the first input position P1 is just a movement reference used by the electronic apparatus 10 to enable the object to execute a drag operation.

Figure 10:
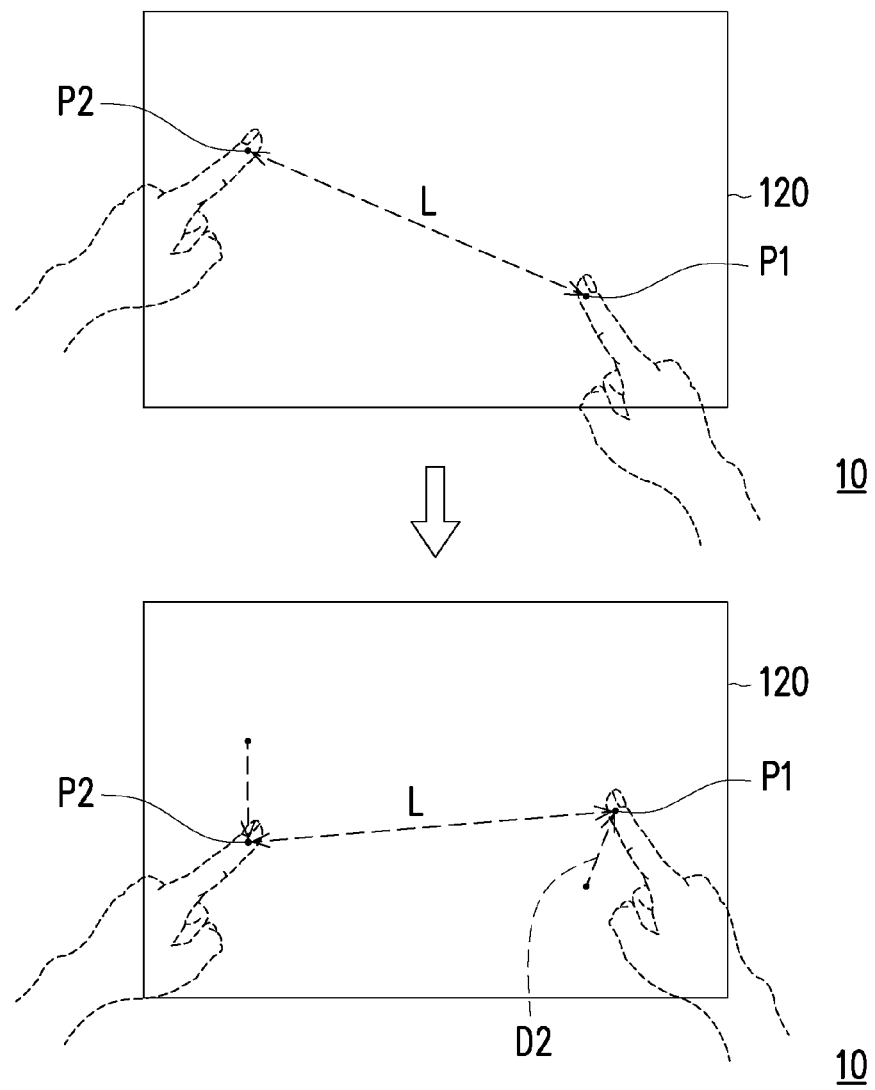
FIG. 10 is a view showing the command formed by the first input signal and the second input signal jointly according to yet another embodiment of the present invention.

FIG. 10 is a view showing the command formed by the first input signal and the second input signal jointly according to a further embodiment of the present invention. Referring to FIG. 2 and FIG. 10, during the detecting period, if the electronic apparatus 10 continuously detects that the first input position P1 and the second input position P2 are changed, but determines that the relative distance L between the first input position P1 and the second input position P2 remains unchanged, the electronic apparatus 10 issues a drag command to an object clicked by the pointer on the virtual display screen according to a displacement direction D2 of the first input position P1 (Step S268).

From a users point of view, the embodiment in FIG. 10 indicates that the relative distance between the first input position P1 and the second input position P2 is kept as L constantly in the case the user continuously presses on the touch module 120 and moves the first input position P1 and the second input position P2. When the electronic apparatus 10 detects that the first input position P1 and the second input position P2 are changed but the relative distance L is unchanged, it determines that the user wants to drag an object, and thus further issues a drag command to the object clicked by the pointer on the virtual display screen according to the displacement direction D2 of the first input position P1.

It is noteworthy that the embodiments as shown in FIG. 5 to FIG. 10 all can be combined with the embodiment in FIG. 4, through the approach of defining the blocks, to accurately detect and identify the first input position P1 corresponding to the first input signal and the second input position P2 corresponding to the second input signal.

Additionally, although the embodiments as shown in FIG. 3 to FIG. 10 according to the present invention all illustrate that the user presses on the touch module 120 with two fingers of both hands to generate the first input signal corresponding to the first input position P1 and the second input signal corresponding to the second input position P2, but user operations are not limited to the aforementioned one. In another embodiment, for example, the user presses on the touch module 120 with two fingers of one hand to generate the first input position P1 corresponding to the first input signal and the second input position P2 corresponding to the second input signal, and the aforementioned touch input method is also applicable to such operation.

Figure 11:
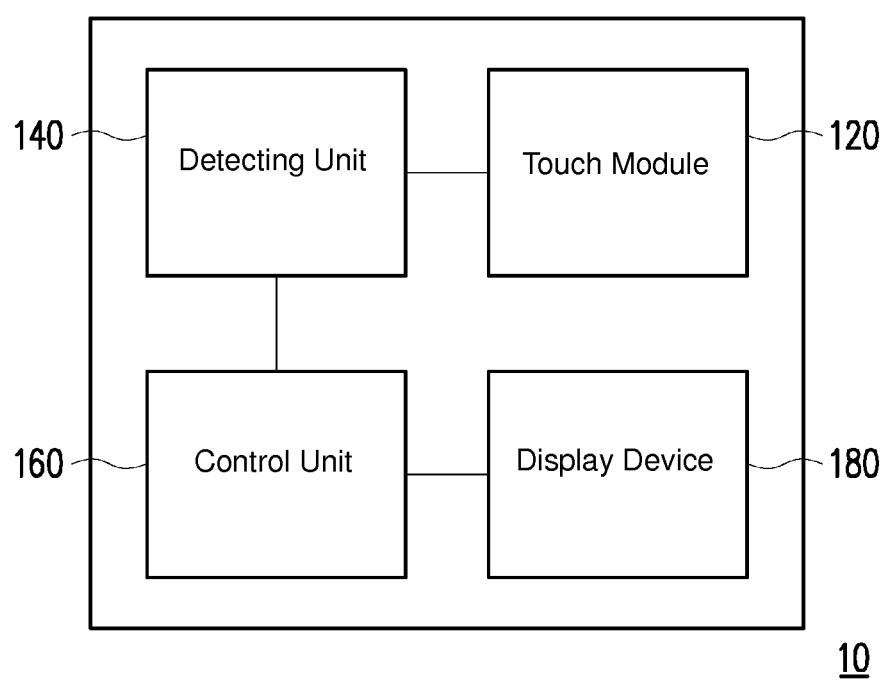
FIG. 11 is a schematic diagram of an electronic apparatus according to an embodiment of the present invention.

In other embodiments of the present invention, an electronic apparatus capable of substantially using the aforementioned touch input method is also provided. FIG. 11 is a schematic diagram of an electronic apparatus according to an embodiment of the invention. The electronic apparatus 10 includes a touch module 120, a detecting unit 140, and a control unit 160. The touch module 120 is used to control a pointer on a virtual display screen. Also, the detecting unit 140 is coupled to the touch module 120 to detect the touch module 120. During a detecting period, the detecting unit 140 detects the first input position P1 and the second input position P2, wherein the first input position P1 is corresponding to a first input signal, and the second input position P2 is corresponding to a second input signal. The control unit 160 is coupled to the detecting unit 140, and controls the pointer to execute a specific function following the command formed by the first input signal and the second input signal jointly.

In other words, the control unit 160 determines the user's operation intent in accordance with the time of input signals, the relative position relationship between multiple input positions and the changes of input positions, and controls the pointer to execute a specific function. Additionally, in an embodiment of the present invention, when the detecting unit 140 detects the first input position P1 corresponding to the first input signal, the control unit 160 can further define the first block A1 and the second block A2 on the touch module 120. The first block A1 comprises a first input position P1. When the detecting unit 140 detects the second input position P2 corresponding to the second input signal on the second block A2, the control unit 160 controls the pointer to execute a specific function according to a command formed by the first input signal and the second input signal jointly.

In the present embodiment, the electronic apparatus 10 further includes a display 180 which is coupled to the control unit 160 and used to display various objects and pointer on a virtual display screen. Refer to the aforementioned embodiments for the detailed operation and settings about how the electronic apparatus 10 performs the touch input method, which will not be repeated herein.

As described above, the touch input method and the electronic apparatus thereof provided in the present invention detects the first input position corresponding to the first input signal and the second input position corresponding to the second input signal, and controls the pointer correspondingly according to a command formed by the first input signal and the second input signal jointly, thereby issuing commands such as select, execute, and drag commonly found with mouse or physical left/right keys. Based on the embodiments described above, users can perform more flexible and more comprehensive operations on the touch module. Therefore, the operational efficiency and the feelings of using the pointer can be improved. Further, the touch module of the electronic apparatus does not need to work with physical left/right keys to issue commands. This also helps simplify the design of the electronic apparatus.

Although a plurality of embodiments have been present in the present invention as above, the described embodiments are not intended to limit the present invention. Various changes and modifications may be made by any person skilled in the art without departing from the scope of the invention. Therefore, the scope of the present invention shall be subject to what has been defined by the appended claims.

What is claimed is:
1. A touch input method, adapted to a touch module for controlling:
 a pointer on a virtual display screen, the touch input method comprising:
   detecting the touch module;
   detecting a first input position and a second input position during a detecting period, wherein the first input position is corresponding to a first input signal, and the second input position is corresponding to a second input signal; and
   forming a command by the first input signal and the second input signal jointly, and executing a specific function by the pointer according to the command;
   wherein the step of executing the specific function by the pointer according to the command comprises:
     when the first input position is continuously detected during the detecting period, if no other input positions are detected within a predetermined period of time after the second input position is detected, issuing a select command to an object clicked by the pointer; and
     when the first input position and the second input position are continuously detected during the detecting period, further detecting a relative change between the first input position and the second input position, and if the relative change is that the first input position and the second input position move towards each other, narrowing a viewing area of the virtual display screen, and if the relative change is that the first input position and the second input position move away from each other, enlarging the viewing area of the virtual display screen.

2. The touch input method as claimed in claim 1, wherein the step of detecting the first input position and the second input position comprises:
   detecting the first input position corresponding to the first input signal; and
   detecting the second input position of the second input signal when the first input position is continuously detected.

3. The touch input method as claimed in claim 2, wherein when the first input position corresponding to the first input signal is detected, a first block and a second block in the touch module is defined, wherein the first block comprises the first input position, and the second block comprises the second input position.

4. The touch input method as claimed in claim 1, wherein the step of executing the specific function by the pointer according to the command further comprises:
   when the first input position is continuously detected during the detecting period, if the second input position are clicked twice and the time interval of two clicks did not exceed a threshold, issuing an execution command to an object clicked by the pointer.

5. The touch input method as claimed in claim 1, wherein when the relative change is that the step of further comprises:
   the second input position remains unchanged while the first input position is changed, issuing a drag command to an object clicked by the pointer according to a displacement direction of the first input position.

6. The touch input method as claimed in claim 1, wherein the step of executing the specific function by the pointer according to the command further comprises:
   when continuously detecting that the first input position and the second input position are changed but a relative distance between the first input position and the second input position remains unchanged during the detecting period, issuing a drag command to an object clicked by the pointer according to a displacement direction of the first input position.

7. An electronic apparatus, comprising:
a touch module, used for controlling a pointer on a virtual display screen;
a detecting unit, coupled to the touch module, the detecting unit detecting the touch module, and detecting a first input position and a second input position during a detecting period, wherein the first input position is corresponding to a first input signal, and the second input position is corresponding to a second input signal; and
a control unit, coupled to the detecting unit for controlling the pointer to execute a specific function according to the command formed by the first input signal and the second input signal jointly;
wherein when the detecting unit continuously detects the first input position during the detecting period, if no other input positions are detected within a predetermined period of time after the second input position is detected, the control unit issues a select command to an object clicked by the pointer;
wherein when the detecting unit continuously detects the first input position and the second input position during the detecting period, the detecting unit further detects a relative change between the first input position and the second input position, and if the relative change detected by the detecting unit is that the first input position and the second input position move towards each other, the control unit narrows a viewing area of the virtual display screen, and if the relative change is that the first input position and the second input position move away from each other, the control unit enlarges the viewing area of the virtual display screen.

8. The electronic apparatus as claimed in claim 7, wherein the detecting unit detects the first input position corresponding to the first input signal and the second input position of the second input signal when the first input position is continuously detected.

9. The electronic apparatus as claimed in claim 8, wherein when the detecting unit detects the first input position corresponding to the first input signal, the control unit defines a first block and a second block in the touch module, and the first block comprises the first input position and the second block comprises the second input position.

10. The electronic apparatus as claimed in claim 7, wherein when continuously detecting the first input position during the detecting period, if the detecting unit detects that the second input position is clicked and triggered twice and the interval between two clicks did not exceed a threshold, the control unit issues an execution command to an object clicked by the pointer.

11. The electronic apparatus as claimed in claim 7, wherein when the second input position detected by the detecting unit remains unchanged, and the first input position is changed, the control unit issues a drag command to an object clicked by the pointer according to a displacement direction of the first input position.

12. The electronic apparatus as claimed in claim 7, wherein during the detecting period, when the detecting unit continuously detects that the first input position and the second input position are changed, but a relative distance between the first input position and the second input position remains unchanged, the control unit issues a drag command to an object clicked by the pointer according to a displacement direction of the first input position.

\* \* \* \* \*